United States Patent

Alley et al.

[15] 3,659,197
[45] Apr. 25, 1972

[54] APPARATUS FOR ELECTRICALLY TESTING A COIL INCLUDING A PRIMARY COIL AND CORE, A PICK-UP COIL, AND LIMITED SUPPLY OF HIGH VOLTAGE D.C. FOR ENERGIZING THE PRIMARY COIL

[72] Inventors: Robert P. Alley; Paul W. Davis, Jr., both of Danville, Ill.

[73] Assignee: General Electric Company

[22] Filed: May 11, 1970

[21] Appl. No.: 37,407

Related U.S. Application Data

[63] Continuation of Ser. No. 698,838, Jan. 18, 1968, abandoned.

[52] U.S. Cl. ............................................................324/51
[51] Int. Cl. ..........................................................G01r 31/02
[58] Field of Search ........................................324/51, 52, 55

[56] References Cited

UNITED STATES PATENTS 3,339,136   8/1967   Rasor et al. ..............................324/54
3,418,570  12/1968   Clinton ....................................324/54

FOREIGN PATENTS OR APPLICATIONS 838,017   5/1952   Germany ................................324/51

*Primary Examiner*—Gerard R. Strecker
*Attorney*—Frank L. Neuhauser, Oscar B. Waddell, John M. Staudt, Ralph E. Krisher, Jr., Radford M. Reams and Joseph B. Forman

[57] ABSTRACT

A primary coil and a core are adapted to be magnetically coupled to a test coil. A pick-up coil is also within the magnetic couple and is electrically connected to a detection or indicating means. A limited supply of high voltage D. C. energy is provided by a capacitor bank. At least one silicon-controlled rectifier serves as a switch between the capacitor bank and the primary coil. The silicon-controlled rectifier is triggered through a four-layer diode with a capacitor in parallel with the four-layer diode providing a repetition rate of switching dependent upon its charging time. A defect, such as a shorted turn, in the test coil will be reflected through the magnetic couple and the pick-up coil to the detection means.

4 Claims, 4 Drawing Figures

PATENTED APR 25 1972 3,659,197

INVENTORS:
ROBERT P. ALLEY,
PAUL W. DAVIS, JR.

BY James E. Espe
THEIR ATTORNEY.

3,659,197

APPARATUS FOR ELECTRICALLY TESTING A COIL INCLUDING A PRIMARY COIL AND CORE, A PICK-UP COIL, AND LIMITED SUPPLY OF HIGH VOLTAGE D.C. FOR ENERGIZING THE PRIMARY COIL

This application is a continuation of application Ser. no. 698,838, filed Jan. 18, 1968, now abandoned.

BACKGROUND OF THE INVENTION

This invention relates generally to apparatus for testing an electrical coil or core and coil assembly and, more specifically, to such apparatus especially adaptable for use in high volume production.

Many defects may occur within an electrical coil during its manufacture. One of the most common defects is that of a shorted turn or turns. This defect is relatively difficult to identify in a manner compatible with high volume production. One reason for this is that test apparatus heretofore available was not sensitive to a single shorted turn within a coil containing several hundred turns, unless it was very elaborate or unless it necessitated relatively time-consuming operations. Another defect which may occur in a coil or core and coil assembly is that which results in corona discharge between high and low potential components. This defect may comprise a void or crack in the insulation separating these components. Test apparatus heretofore available was incapable of applying sufficient voltage to test for corona discharge without risk of complete destruction of the component being tested.

Accordingly, it would be desirable to provide an apparatus to test an electric coil, or coil and core assembly, which is sensitive enough to detect a single shorted turn and yet capable of applying sufficient voltage to test for corona discharge without risk of destruction of the component being tested.

SUMMARY OF THE INVENTION

Briefly stated, in accordance with one aspect of the present invention, there is provided a test apparatus for testing an electrical coil. The apparatus includes a primary coil and core assembly adapted to be magnetically coupled to the coil to be tested. A pick-up coil is magnetically coupled with the core and coil assembly. A limited source of high voltage direct current energy is provided and switching means are also provided to repetitively apply the direct current energy to the primary coil of the core and coil assembly. This provides a high voltage pulse of limited energy impressed on both the coil to be tested and the pick-up coil through the coil and core assembly. Detection means are electrically connected to the pick-up coil whereby a defect in the coil to be tested will be reflected through the pick-up coil to the detection means.

BRIEF DESCRIPTION OF THE DRAWING

While the specification concludes with claims particularly pointing out and distinctly claiming the subject matter which is regarded as the invention, it is believed the invention will be better understood from the following description of the preferred embodiment taken in connection with the accompanying drawing, in which:

DESCRIPTION OF THE PREFERRED EMBODIMENTS

Figure 1:
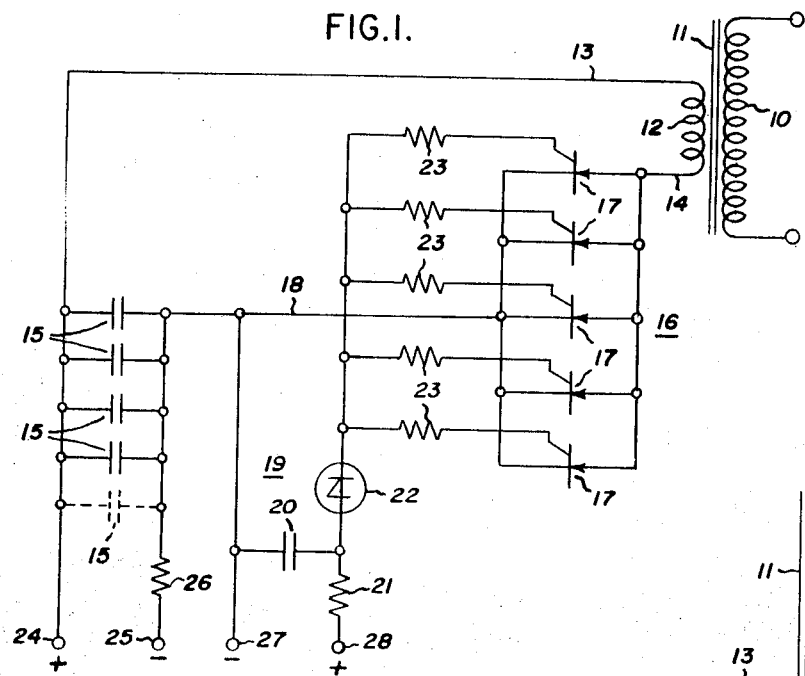
FIG. 1 is a schematic circuit diagram of the electrical connections of the apparatus of the present invention.

Referring now to the drawings, and particularly to FIG. 1 thereof, an apparatus to electrically test a coil is illustrated. The coil to be tested, or the test coil, is coil 10 which is magnetically coupled by means of core 11 to a primary coil 12. Primary coil 12 is electrically connected across lines 13 and 14. Line 13 directly connects to a limited source of direct current energy in the form of a capacitor bank comprising capacitors is connected in parallel with each other. Line 14 also is electrically connected to the capacitor bank through a switching means 16 comprising a plurality of silicon-controlled rectifiers 17 connected in parallel with each other and in series fashion between the capacitor bank and primary coil 12. Line 14 is connected to the anode of each of the silicon-controlled rectifiers 17. Similarly, a line 18 interconnects the cathode of each of the silicon-controlled rectifiers 17 to the opposite side of the capacitor bank.

The silicon-controlled rectifiers 17 are triggered, fired or switched to a conducting state by a trigger means or circuit 19 which may include a capacitor 20, a resistor 21, a four-layer diode 22, such as a two-terminal unidirectional break-down diode, and a plurality of resistors 23, one of which is in series with the gate of each silicon-controlled rectifier 17. Other triggering means may, of course, be employed to trigger silicon-controlled rectifiers 17.

The operation of the apparatus and circuit of FIG. 1 is as follows. The capacitor bank comprising capacitors 15 is charged from a direct current energy source applied across terminals 24 and 25 through a resistor 26. Terminals 27 and 28 of trigger means 19 are also connected across a source of direct current energy. The energy applied to trigger means 19 at terminals 27 and 28 charge capacitor 20 through resistor 21. When capacitor 20 reaches a predetermined charge, the voltage across four-layer diode 22 is sufficient to switch four-layer diode 22 to its conducting state which will apply a signal to the gate of each of the silicon-controlled rectifiers 17, through resistors 23. This signal is sufficient to trigger the silicon-controlled rectifiers to their conducting state. When this occurs, the energy stored in the capacitor bank is discharged through primary coil 12 and the conducting silicon-controlled rectifiers. This energy is transformed from primary coil 12, through the magnetic couple provided by core 11 to the test coil 10. As will be discussed more fully hereinafter, test coil 10 may be connected to a detection or indicating means in a manner whereby a defect in coil 10 may be detected, as a result of the signal received by the detection means, since the characteristics of the signal will be affected by a defect present in test coil 10.

In the preferred form of the present invention, the circuit has been built and satisfactorily operated using the following elements:

| | |
|---|---|
| Capacitor 16 | Extended foil, 3 microfarads, 400 v.d.c. |
| Resistor 26 | 10 ohms, 25 watts |
| Silicon-controlled rectifier 17 | General Electric Model C141D |
| Capacitor 20 | Extended foil, 0.1 microfarad, 400 v.d.c. |
| Resistor 21 | 150,000 ohm, 1 watt |
| Four-layer diode 22 | Clevite Corp. Model 4G100 Schockley four-layer diode |
| Resistors 23 | 18 ohm, 1 watt, carbon matched to 1% |

With the foregoing elements, terminals 24 and 25 are connected to an energy source of up to 400 volts d.c., the actual voltage depending upon the signal required at primary coil 12 to adequately test coil 10, with current limited to 0.5 amp. Terminals 27 and 28 are connected to a direct current energy source of 200 volts set to give 100 cycles per second repetition rate of triggering of silicon-controlled rectifiers 17.

As indicated by the one of capacitors 15 drawn in dotted fashion in FIG. 1, the number of capacitors 15 comprising the capacitor bank may vary with the requirements of the coil being tested. Desirably, the number and size of capacitors 15 should be chosen to subject test coil 10 to a very high rate of flux change so as to induce a very sharp voltage front within the coil. This rate of voltage rise should preferably be high enough to excite the coil into resonance between its distributed inductance and capacitance. The capacitor bank produces this desired high rate of flux change and sharp voltage front by its sudden discharge which is of limited energy content. If a low resistance defect exists in a single turn of the test coil, this defect will absorb enough energy from the limited supply so that the oscillating voltage appearing across the terminals of the test coil will be substantially damped to indicate this defect.

Figure 2:
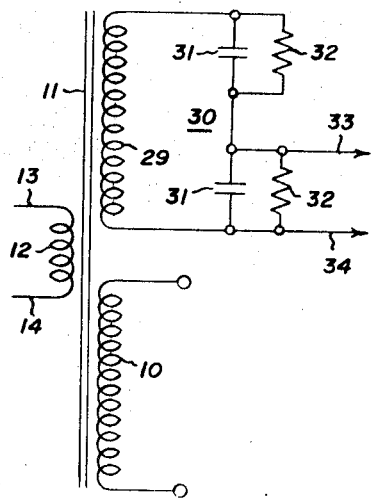
FIG. 2 is a fragmentary schematic circuit diagram showing a modification of the circuit of FIG. 1.

Referring now to FIG. 2, a modified means of coupling the detection or indicating means to test coil 10 is illustrated. It will be observed that test coil 10, core 11 and primary coil 12 all carry the same designations as in FIG. 1. Moreover, lines 13 and 14 connect to the switching means 16 and trigger means 19 illustrated in FIG. 1. A pick-up coil 29 is magnetically coupled to test coil 10 and primary coil 12 by means of core 11. Coil 29 is connected to a voltage divider 30 comprising capacitors 31 and resistors 32. By properly proportioning the individual capacitors 31 with respect to each other and resistors 32 with respect to each other, it is possible to tap off a signal on lines 33 and 34 which has 0.001 the voltage appearing across the terminals of pick-up coil 29. Leads 33 and 34 may extend to an indicating device such as, for example, a cathode ray oscilloscope. With the arrangement of FIG. 2, if the system is operated without the test coil coupled to core 11, a curve will appear on the oscilloscope representing a decaying oscillating voltage. If a test coil is coupled to core 11, and has no defect, a similar curve will appear on the scope when the system is actuated but the curve will have slightly less amplitude, decreased by approximately 10 percent, and the frequency of oscillation will be decreased to about one-half. If the test coil coupled to core 11 has a defect, such as a shorted turn for example, the curve appearing on the oscilloscope will be substantially damped thus indicating the defect. Similarly, if a coil is tested having a defect causing corona discharge or shorting to the core, an erratic curve or discontinuous curve will appear on the oscilloscope screen thus indicating the defect.

It may be desirable in some cases when an oscilloscope is used to connect the external trigger of the scope to the line between four-layer diode 22 and resistors 23 to start the scope trace momentarily prior to firing of the silicon-controlled rectifiers 17. By connecting the external trigger of the scope in this fashion, the trace starts in response to the gate signal which triggers the silicon-controlled rectifiers. If this is done, the scope ground connection should be connected to line 18.

Figure 3:
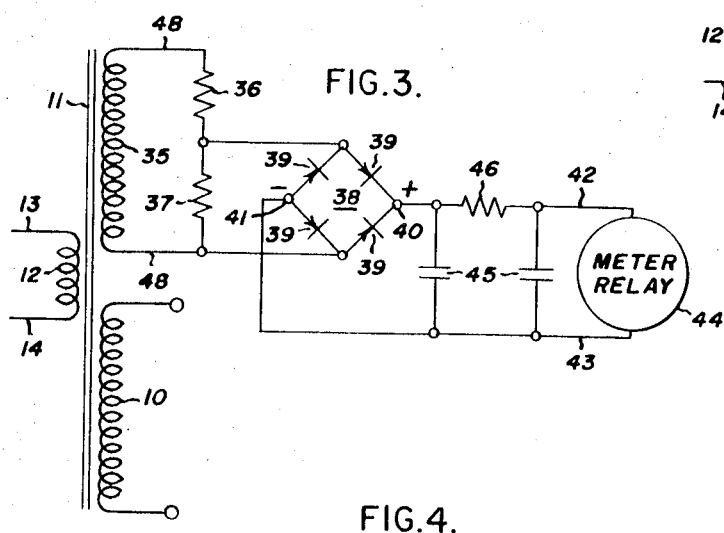
FIG. 3 is a fragmentary schematic circuit diagram showing another modification of the circuit of FIG. 1; and, FIG. 4 is a sectional view of the primary coil and core assembly with pick-up coil and test coil attached.

Turning now to FIG. 3, a system is shown whereby the signal from the pick-up coil may be employed to operate a meter relay which in turn can control an "accept or reject" mechanism in a production line. The pick-up coil 35 is connected through a voltage divider including resistors 36 and 37 to a rectifier bridge 38. Rectifier bridge 38 includes rectifiers or diodes 39 interconnected in conventional fashion to provide a positive terminal 40 and a negative terminal 41. Terminals 40 and 41 are connected respectively to lines 42 and 43. Lines 42 and 43 connect to a meter relay 44 through a filter network comprising capacitors 45 and resistor 46.

The foregoing circuit has been constructed and successfully operated. Preferably, the capacitor bank comprising capacitors 15 and terminals 24 and 25 are selected and charged to apply approximately a 200-volt pulse across primary coil 12. Pick-up coil 35 has a 200 to 1 ratio with primary coil 12 so that a 4,000-volt pulse is created across coil 35. Resistors 36 and 37 are selected to provide a 1,000 to 1 ratio, thus providing a 4-volt peak potential across rectifier bridge 38. After the voltage drop across resistor 46, a peak voltage is impressed on meter relay 44 of approximately 3 volts.

In practice, the meter relay comprises a microamp meter having an internal impedance that the three peak volts impressed thereacross will register approximately four microamps average. The movable needle or arm of the relay carries a flag at its distal end which is brought into registry with a beam of light impinging on a light-sensitive element. When the needle is moved to an extent representing 3.5 to 4 microamps, the beam of light is interrupted and the light-sensitive element triggers an "accept or reject" device. If the pulse impressed on the meter is insufficient to create a current therethrough of 3 microamps, the meter reads less than 3 microamps, the light beam will not be interrupted and the "accept or reject" device associated with the light-sensitive element will not be actuated.

With the foregoing arrangement, it has been found in practice that a test coil having 1,080 turns of 0.010 inch diameter copper coil wire, when magnetically coupled with core 11, in the manner illustrated in FIG. 3, will register approximately 2 microamps through the meter relay when an approximately 200-volt pulse is impressed on primary coil 12 if the test coil has one shorted turn.

Figure 4:
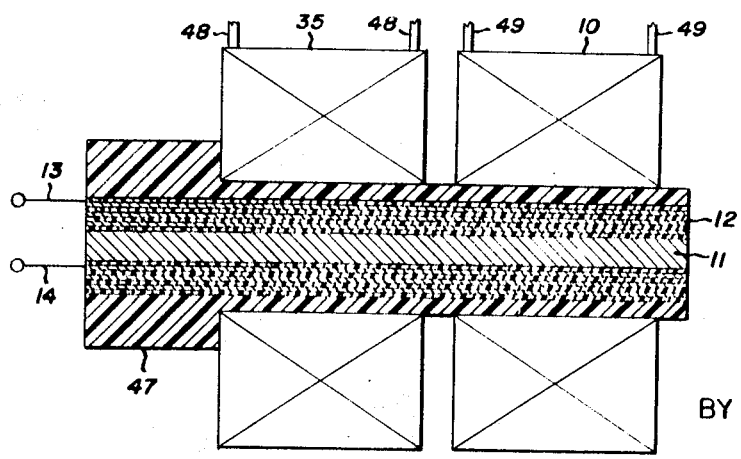

Turning now to FIG. 4, the mechanical aspects of primary coil 12, core 11 and pick-up coil 35 are illustrated. Core 11 and primary coil 12 are assembled to form a unitary structure encapsulated by suitable insulating plastic material forming an outer sheath 47. Core 11 comprises a generally linear elongated bar which may be of substantially square cross section. Primary coil 12 comprises approximately three turns of copper foil wound about core 11 along with a strip of insulating film in a fashion whereby the individual turns of the coil are insulated from each other as well as from core 11. Pick-up coil 35 has a central bore which receives the smaller diameter portion of sheath 47 in a relatively snug fit so that pick-up coil 35 will be securely carried by sheath 47 as the core and coil assembly is moved into and out of succeeding test coils 10. In the preferred form of the present invention, the primary coil and core assembly is linear so as to provide an elongated probe which can be inserted easily into individual test coils and also to provide a tight magnetic couple among coils 10, 12 and 35. If desired, the sheath may be given a third cross-sectional dimension slightly less than the cross-sectional dimension adjacent pick-up coil 35 so that if the central bore in test coil 10 is of the same diameter as the bore in pick-up coil 35, sheath 47 may be conveniently and easily inserted into and withdrawn from the center bore of coil 10. It is to be understood, of course, that in the preferred operation of the present invention, leads 48 of pick-up coil 35 interconnect coil 35 with resistors 36 and 37 of FIG. 3 as illustrated in FIG. 3. Similarly, leads 49 of test coil 10 remain unconnected to any external element during test with any defect in coil 10 being reflected back through pick-up coil 35 to the meter relay 44.

It should be appreciated that the foregoing arrangement may be employed to test a complete transformer or fluorescent lamp ballast by connecting the transformer or ballast to a secondary coil (not shown) coupled to the test circuit in a manner substantially identical to that of test coil 10 in the above description. The wave form may vary from that obtained with a plain test coil, including variances in magnitude, frequency and time of decay. But if the meter relay 44, or the oscilloscope if one is used, is preconditioned to identify a nondefective transformer or ballast, it will detect a defective transformer or ballast in the same fashion as described above. For example, in such an arrangement to test a pulse transformer having six turns in its primary coil and 120 turns in its secondary coil, a 16,000-volt pulse can be induced in the transformer secondary by employing a three-turn primary coil 12, a 12-turn coil in place of test coil 10 and electrically connecting the 12-turn coil to the transformer primary. Similarly, the input leads to a fluorescent lamp ballast may be connected to the 12-turn coil and a detection means connected to the output leads of the ballast to test a fluorescent lamp ballast with the present invention.

Thus, it can be seen that the present invention provides an apparatus to test an electric coil or coil and core assembly which is sensitive enough to detect a single shorted turn but yet capable of applying sufficient voltage to test for corona discharge without risk of destruction of the component being tested. Destruction of the component being tested is precluded by reason of the limited energy available from the capacitor bank to create the high voltage pulse in test coil 10.

As will be evident from the foregoing description, certain aspects of the invention are not limited to the particular details of construction of the examples illustrated, and it is contemplated that various other modifications or applications will occur to those skilled in the art. It is therefore intended that the appended claims shall cover such modifications and applications as do not depart from the true spirit and scope of the invention.

We claim:

1. Apparatus to electrically test a coil comprising:
   a. a primary coil and core assembly adapted to be magnetically coupled with the coil to be tested, said primary coil and core assembly comprises an elongated substantially linear core element, a primary coil wound around said core element, said coil being formed from a metal foil strip having a width substantially equal to the length of said core element and a strip of insulating material to insulate the individual turns of said coil from each other and from said core assembly, and a non-conductive molded sheath encapsulating said coil and said core,
   b. a pick-up coil magnetically coupled with said coil and core assembly, said coil to be tested and said pick-up coil being received over said sheath in a side-by-side relationship, the combined axial length of said coil to be tested and said pick-up coil being less than the width of said metal foil strip,
   c. a limited source of high voltage direct current energy,
   d. semiconductive repetitive switching means having a fast turn-on time to repetitively apply said direct current energy to said primary coil of said coil and core assembly,
   e. whereby a high voltage pulse of limited energy will be induced in both said coil to be tested and said pick-up coil through said coil and core assembly,
   f. detection means electrically connected to said pick-up coil whereby a defect in said coil be be tested will be reflected through said pick-up coil to said detection means.

2. The invention of claim 1 wherein said limited source of direct current energy comprises a plurality of capacitors connected in parallel to each other.

3. The invention of claim 1 wherein said repetitive switching means comprises at least one silicon-controlled rectifier, trigger means for said silicon-controlled rectifier including a unidirectional four-layer breakdown diode electrically connected to the gate of said silicon-controlled rectifier and a capacitor connected to said four-layer diode, whereby the repetition rate of said switching means is dependent upon the charging time of said capacitor.

4. The invention of claim 1 wherein said detection means comprises a meter relay electrically connected to said pick-up coil through a voltage divider, a rectifier bridge and a filter network.

* * * * *